United States Patent
Li et al.

(10) Patent No.: US 9,438,876 B2
(45) Date of Patent: Sep. 6, 2016

(54) METHOD FOR SEMANTICS BASED TRICK MODE PLAY IN VIDEO SYSTEM

(75) Inventors: Jun Li, Cranbury, NJ (US); Xiaojun Ma, Beijing (CN); Jun Xu, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/824,344

(22) PCT Filed: Sep. 17, 2010

(86) PCT No.: PCT/US2010/002548
§ 371 (c)(1),
(2), (4) Date: Mar. 15, 2013

(87) PCT Pub. No.: WO2012/036658
PCT Pub. Date: Mar. 22, 2012

(65) Prior Publication Data
US 2013/0188933 A1    Jul. 25, 2013

(51) Int. Cl.
*H04N 9/80* (2006.01)
*G11B 27/00* (2006.01)
(Continued)

(52) U.S. Cl.
CPC .............. *H04N 9/80* (2013.01); *G11B 27/005* (2013.01); *G11B 27/28* (2013.01); *H04N 5/783* (2013.01)

(58) Field of Classification Search
CPC ...... H04N 9/80; H04N 5/783; G11B 27/005; G11B 27/28
USPC ........ 386/343–348, 205, 218, 314, 319, 350
See application file for complete search history.

(56) References Cited

U.S. PATENT DOCUMENTS

| 5,655,117 A | * | 8/1997 | Goldberg et al. |
| 2002/0039481 A1 | * | 4/2002 | Jun et al. ........................ 386/68 |

(Continued)

FOREIGN PATENT DOCUMENTS

| CN | 1732685 | 2/2006 |
| CN | 1905661 A | 1/2007 |

(Continued)

OTHER PUBLICATIONS

Cooper, M. et al., "Scene Boundary Detection Via Video Self-Similarity Analysis", FX Palo Alto Laboratory, Palo Alto, CA 94304, Apr. 26, 2011, http://www.fxpal.xerox.com.

(Continued)

*Primary Examiner* — Thai Tran
*Assistant Examiner* — Nien-Ru Yang
(74) *Attorney, Agent, or Firm* — Brian J. Dorini; Reitseng Lin

(57) ABSTRACT

Trick mode play for controlling video content playback can be realized using a semantic based criterion in order to achieve a more uniform playback experience for the viewer, when that viewer wishes to observe the video content presented according to a selected semantic. In one embodiment of the method, semantics associated with shorter time intervals in the video content are replayed in trick mode play proportionally slower than semantics associated with longer time intervals, wherein the proportionally is determined, at least in part, to the time interval associated with each semantic. In various embodiments, semantics can include scenes, audio, metadata, tags, and the like. The semantics based trick mode play approach allows for a more uniform viewing experience, on a time duration basis, from one semantic to the next.

13 Claims, 2 Drawing Sheets

Playback Control Algorithm

(51) Int. Cl.
    *G11B 27/28* (2006.01)
    *H04N 5/783* (2006.01)

(56) References Cited

U.S. PATENT DOCUMENTS

| | | | |
|---|---|---|---|
| 2002/0099774 A1 | 7/2002 | Yamato et al. | |
| 2003/0035075 A1 | 2/2003 | Butler et al. | |
| 2003/0165321 A1* | 9/2003 | Blair et al. | 386/68 |
| 2004/0240841 A1 | 12/2004 | Takagi et al. | |
| 2006/0041908 A1 | 2/2006 | Kim et al. | |
| 2007/0025687 A1 | 2/2007 | Kim | |
| 2007/0206024 A1 | 9/2007 | Rao | |
| 2008/0069516 A1 | 3/2008 | Takahashi et al. | |
| 2008/0107401 A1* | 5/2008 | Vannier | 386/112 |
| 2008/0155627 A1* | 6/2008 | O'Connor et al. | 725/109 |
| 2008/0209075 A1 | 8/2008 | Shamma | |
| 2008/0263605 A1 | 10/2008 | Mine et al. | |
| 2009/0089844 A1 | 4/2009 | Beyabani | |
| 2009/0153289 A1 | 6/2009 | Hope et al. | |
| 2009/0172780 A1 | 7/2009 | Sukeda et al. | |
| 2009/0196575 A1 | 8/2009 | Masuo | |
| 2009/0198607 A1 | 8/2009 | Badger et al. | |
| 2009/0300499 A1 | 12/2009 | Fukui | |
| 2009/0317064 A1 | 12/2009 | Matsubayashi | |
| 2009/0327894 A1 | 12/2009 | Rakib et al. | |
| 2010/0195975 A1* | 8/2010 | Issa et al. | 386/68 |
| 2011/0064386 A1 | 3/2011 | Gharaat et al. | |
| 2011/0196918 A1 | 8/2011 | Kkunigita et al. | |
| 2011/0218997 A1 | 9/2011 | Boiman et al. | |
| 2013/0188933 A1 | 7/2013 | Li et al. | |

FOREIGN PATENT DOCUMENTS

| | | |
|---|---|---|
| CN | 101599241 A | 12/2009 |
| EP | 0827092 | 3/1998 |
| EP | 1833050 A1 | 9/2007 |
| EP | 1845724 A1 | 10/2007 |
| JP | 10243351 | 9/1998 |
| JP | 11112870 | 4/1999 |
| JP | 2002218277 | 8/2002 |
| JP | 2002330419 | 11/2002 |
| JP | 2005286798 | 10/2005 |
| JP | 2007174245 | 7/2007 |
| JP | 2007306088 | 11/2007 |
| JP | 2007318200 | 12/2007 |
| JP | 2008259119 | 10/2008 |
| JP | 2009124298 | 6/2009 |
| JP | 2009130876 | 6/2009 |
| JP | 2009159188 | 7/2009 |
| JP | 20091828203 | 8/2009 |
| WO | 99/30488 | 6/1999 |
| WO | 03/051043 A1 | 6/2003 |
| WO | 2004/059971 A1 | 7/2004 |
| WO | WO2005036875 | 4/2005 |
| WO | WO2006064749 | 6/2006 |
| WO | 2006/092765 A2 | 9/2006 |
| WO | WO2007110813 | 10/2007 |
| WO | WO2007148777 | 12/2007 |
| WO | WO2009097492 | 8/2009 |
| WO | WO2010023828 | 3/2010 |
| WO | WO2011120195 | 10/2011 |

OTHER PUBLICATIONS

Truong B. et al., "Automatic Scene Extraction in Motion Pictures", IBM Research Report, IBM Research Division, Yorktown Heights, NY 10598, Sep. 24, 2002.
International Search Report of subject application dated: Dec. 28, 2010.
International Search Report of related U.S. Appl. No. 13/634,864 (PCT/CN2010/000413).
Foina, Aislan G., et al., "How a Cell Phone can Change Dramatically the Way We Watch TV," May 18, 2009, EUROCON 2009, IEEE Piscataway, pp. 1265-1271.
EP Search Report for Corresponding EP Application No. 10848657.2 dated Oct. 24, 2013.
US Non-Final Office Action for related U.S. Appl. No. 13/634,864 dated Nov. 27, 2013.
Final Office Action for Related U.S. Appl. No. 13/634,864 dated Aug. 27, 2014.
CN Search Report dated Jul. 15, 2015 for Related CN Application No. 201080066014.3.
US Non-Final Office Action dated Mar. 27, 2015 for Related U.S. Appl. No. 13/634,864.
US Final Office Action dated Oct. 8, 2015 for Related U.S. Appl. No. 13/634,864.
US Office Action for Related U.S. Appl. No. 13/634,864 Dated Mar. 27, 2015.
CN Search Report dated Aug. 31, 2015 for corresponding CN Application No. 201080070212.7.
US Office Action for Related U.S. Appl. No. 13/634,864 dated Oct. 8, 2015.
CN Search Report for Related CN Application No. 201080066014.3 dated Jul. 15, 2015.

* cited by examiner

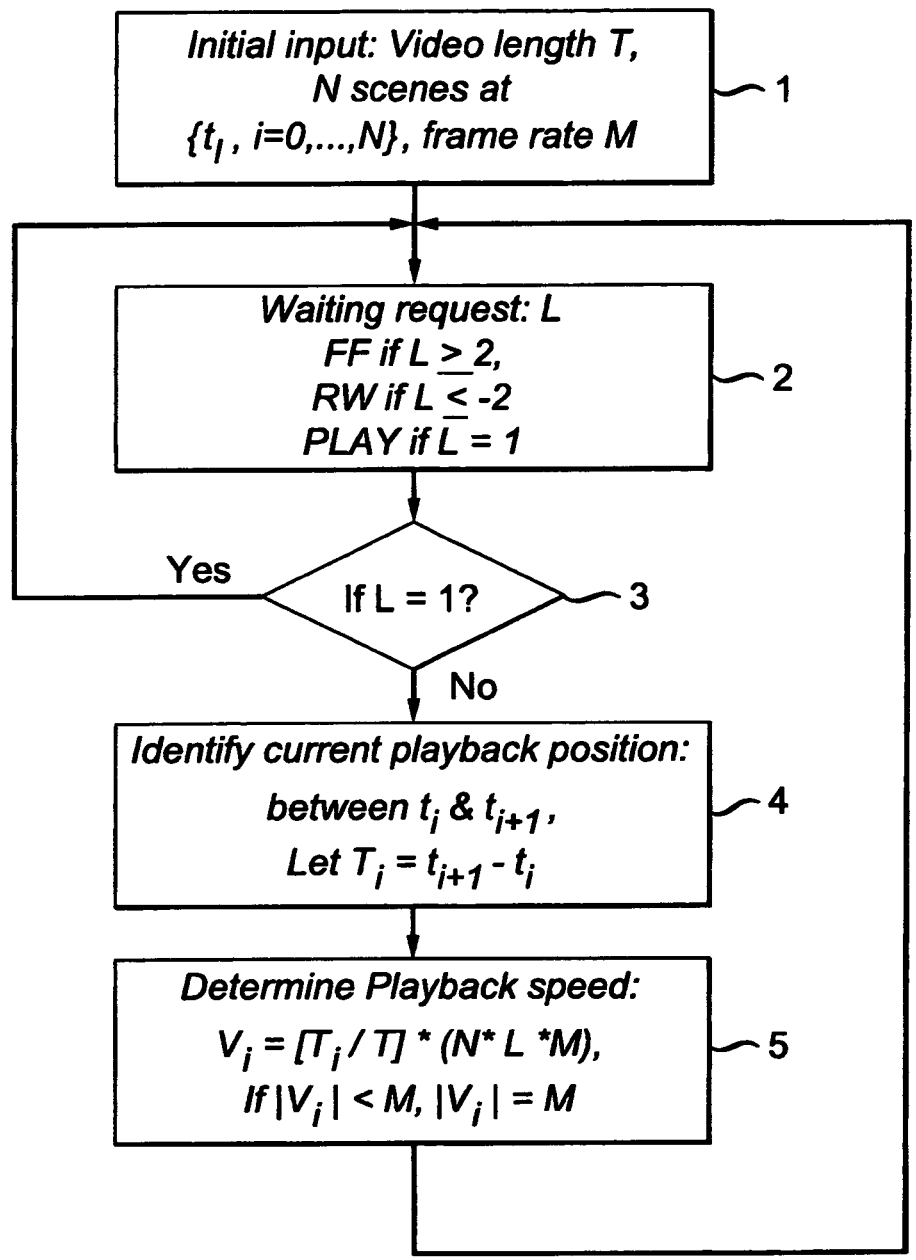
FIG. 2 Playback Control Algorithm

METHOD FOR SEMANTICS BASED TRICK MODE PLAY IN VIDEO SYSTEM

This application claims the benefit, under 35 U.S.C. §365 of International Application PCT/US2010/002548, and filed Sep. 17, 2010, which was published in accordance with PCT Article 21(2) on Mar. 22, 2012, in English, which is herein incorporated by reference in its entirety.

CROSS-REFERENCE TO RELATED APPLICATIONS

Further, this application is related to PCT Patent Application Serial No. PCT/CN2010/000413, filed in the PCT on Mar. 31, 2010, now U.S. application Ser. No. 13/634,864, filed Sep. 13, 2012, which is herein incorporated by reference in its entirety.

TECHNICAL FIELD

The present invention relates generally to the field of video display techniques and, more particularly, to video playback using one or more trick modes.

BACKGROUND OF THE INVENTION

Trick mode operations are traditionally thought to include forward and reverse playback modes for video, among other operations. In general, fast forward and fast reverse operations for video playback control as well as their slow motion counterparts are implemented on the basis of time. That is, whether in a forward direction or a reverse direction, a fast playback is performed at some integer multiple of the normal playing speed, where the magnitude of the exemplary integer multiplier is greater than one (1). It should be understood that slow motion replay is performed by using a multiplier with a magnitude that is less than one and greater than zero. For completeness, the sign of the multiplier is utilized to determine the direction of the operation, where a positive sign will usually designate a forward operation while a negative sign will usually designate a reverse operation.

Fast forward or fast reverse operations will cause the video content from a longer time interval to be compressed and replayed in a much shorter time interval proportionally related to the speed multiplier for the replay operation. For example, a Fast Forward (FF) 2× will cause the video content to be played in a forward direction at twice the normal playing speed so that two seconds of video content is played in every one second interval. Higher speeds, such as 4×, 8×, and 16×, will cause a proportionally greater amount of video content to be played in every one second interval.

Such trick mode operations are based solely on time to the apparent exclusion of any other basis or criterion not related to time. This means that the timeline or time sequence of the video content is evenly compressed or evenly expanded for standard trick mode play operations such as fast forward/reverse replay and slow forward/reverse replay, respectively. While standard trick mode play may be suitable for many viewers, it has been recognized that such a time based approach can actually cause an uneven trick mode playback rate for certain aspects of the video content that may appeal to other viewers. For example, video scenes will be unevenly replayed in time using the standard time-based trick mode playback because longer scenes will occupy a proportionally longer amount of the playback time over shorter scenes, all directly proportional to the particular scene time duration or length. The video content information in short scene may be nearly impossible to discern during a fast reverse or fast forward operation in contrast to a significantly longer duration scene, especially when the speed is a significantly high multiple of the normal speed such as 4× and 8×, for example. Thus, trick mode play operations based solely on time fall short in meeting all the needs for viewers of video content.

SUMMARY OF THE INVENTION

Embodiments of the present invention are directed at least in part to addressing the deficiencies of the prior art by proving a method for semantics based trick mode playback in video systems.

In one embodiment of the present invention, trick mode play for controlling video content playback is realized using a semantic based criterion in order to achieve a more uniform playback experience for the viewer, when that viewer wishes to observe the video content presented according to a selected semantic. In such an embodiment using an exemplary fast forward/reverse trick mode play, semantics associated with shorter time intervals in the video content are replayed in trick mode play proportionally slower than semantics associated with longer time intervals, wherein the proportionally is determined, at least in part, to the time interval associated with each semantic. This approach allows for a more uniform viewing experience, on a time duration basis, from one semantic to the next.

In various embodiments of the present invention, semantics include video scenes as described above. They can also include such other characteristics and data as one or more selected metadata elements for the video content, tags associated with the video content, subtitles in the video content, audio features in the video content including dialogue and characteristic noises, and any other definable identifiable aspects of the video content such as color features, scene details, instantaneous coding rate, and the like. In the various embodiments of the present invention, the semantic for the instantaneous coding rate can be used to indicate the presence of more or fewer scene changes. For example, a higher instantaneous coding rate may infer the occurrence of more semantic occurrences such as scene changes.

In accordance with various embodiments of the present invention, the video content can be replayed via a trick mode play using a particular semantic basis wherein each interval of video content corresponding to a selected semantic occurrence such as a scene, for example, is replayed for an amount of time that is inversely proportional to the time interval of the particular semantic occurrence. Thus, the rate at which semantic occurrences are presented to a viewer using the present semantic based trick mode play operation will be inversely proportional to the density of the selected semantics along the timeline of the video content. A higher density of semantics per unit time for the video content is indicative of a relatively short time interval for each semantic occurrence, where the time interval is measured from the first occurrence of a selected semantic until the next occurrence of the selected semantic. Using the example of a scene based fast forward trick mode play, embodiments of the present invention enable video content to be presented to the viewer at a slower trick mode play rate, when more scenes occur in a particular time interval (i.e., higher density of scenes), than the higher trick mode play rate, when fewer scenes occur in the same duration time interval (i.e., lower density of scenes). In this way, the viewer is able to view each selected semantic occurrence for approximately the same amount of time in the desired trick mode.

BRIEF DESCRIPTION OF THE DRAWINGS

The teachings of the present invention can be readily understood by considering the following detailed description in conjunction with the accompanying drawings, in which:

FIG. 2 depicts a flow diagram of a method for implementing at least a portion of semantics based trick mode play operation in accordance with an embodiment of the present invention.

Figure 1:
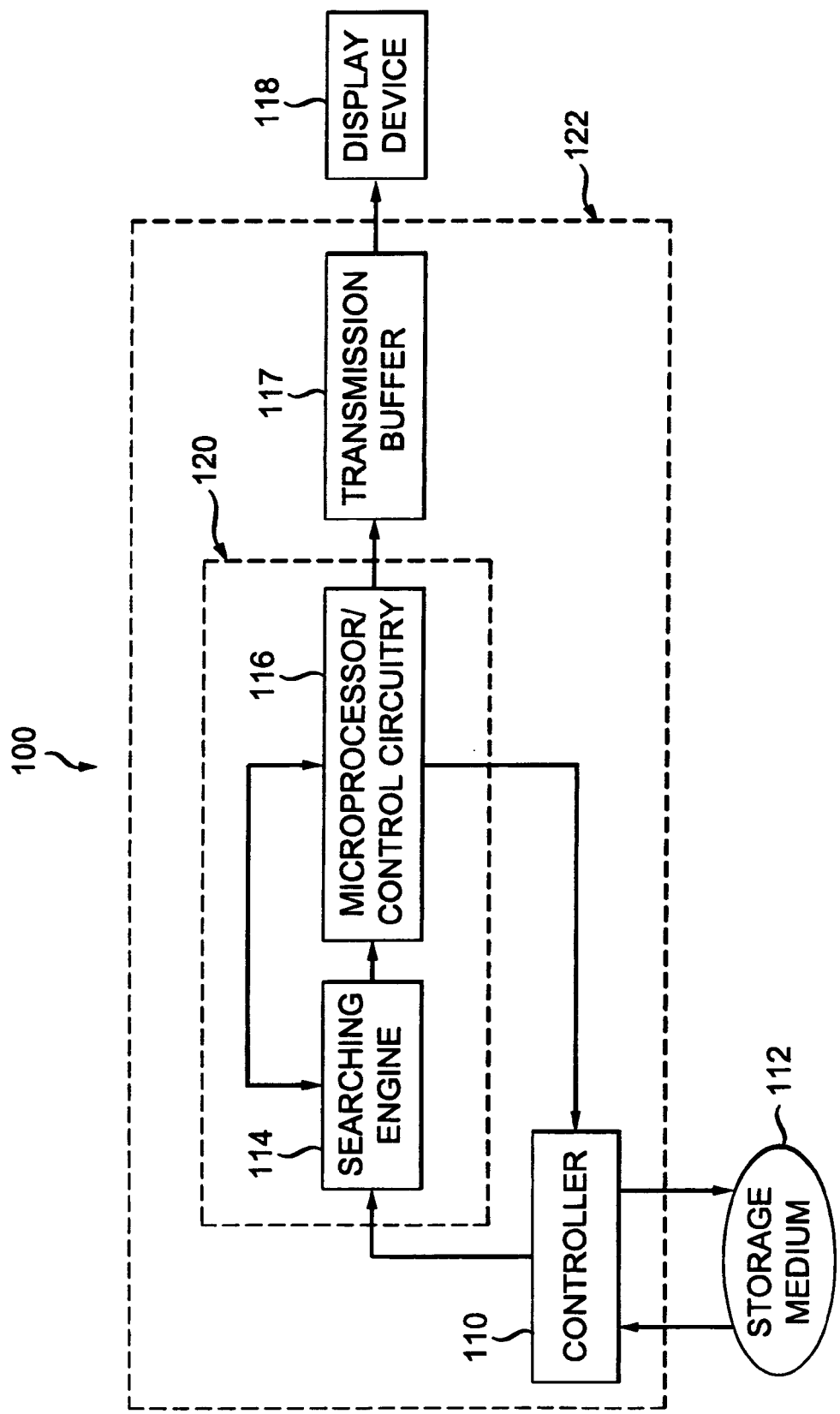
FIG. 1 depicts a high level block diagram of a system that can perform a method for semantics based trick mode playback in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method for semantics based trick mode playback in video systems. Although the present invention will be described primarily within the context of digital motion video information such as the various MPEG formats and fast motion trick mode playback, the specific embodiments of the present invention should not be treated as limiting the scope of the invention. It will be appreciated by those skilled in the art and informed by the teachings of the present invention that the concepts of the present invention can be advantageously applied to substantially any content in other trick mode playback, such as slow motion trick mode playback.

Embodiments of the trick mode method described herein control the replay of video content using semantic information. The video content may be augmented by additional data about the video content including, but not limited to, metadata, video tags, subtitles, index files, and the like. The various types of, and formats for, digital motion video content as well as the additional data that may accompany the video content are believed to be well known in the art and documented within the archives of the respective standards bodies, for example. No further explanation will be presented herein on this topic.

Throughout the course of the present description, the terms "trick play", "trick mode", "trick play mode", and "trick mode play" may all be used interchangeably without any intended limitation or change of meaning and scope. Of course, all attempts will be made in this description to maintain a consistency in the usage of terminology such as the terms shown above.

All examples and conditional language recited herein are intended for pedagogical purposes to aid the reader in understanding the present principles and the concepts contributed by the inventors to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the present invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figure may be provided through the use of dedicated hardware as well as hardware capable of executing software in association with the appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Embodiments of the methods described herein can be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. As should be clear, a processor may include a processor-readable medium having, for example, instructions for carrying out a process. Such application programs may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It should be understood that the elements shown in the figures may be implemented in various forms of hardware, software, or combinations thereof. Preferably, these elements are implemented in a combination of hardware and software on one or more appropriately programmed general-purpose devices, which may include a processor, memory and input/output interfaces. Moreover, the implementations described herein may be implemented as, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented as mentioned above. The methods may be implemented in, for example, an apparatus such as, for example, a processor, which refers to processing devices in general, including, for example, a computer, a microprocessor, an integrated circuit, or a programmable logic device. Processing devices also include communication devices such as: cell phones, portable/personal digital assistants ("PDAs"), other devices that facilitate communication of information between end-users, video coders, video decoders, video codecs, web servers, set-top boxes, personal recording devices such as PVRs and computers running recording software, camcorders, streaming of data over the Internet or other communication links, and video-on-demand.

For example, FIG. 1 depicts a high level block diagram of a system that can perform a method for semantics based trick mode playback in accordance with an embodiment of the present invention. The system 100 can include a controller 110 for reading data from and writing data to a storage medium 112. The system 100 can also have a searching engine 114, a microprocessor 116, a transmission buffer 117 and a display device 118. The searching engine 114 can contain suitable software and circuitry for locating one or more particular types of pictures in a video signal read from the storage medium 112. Control and data interfaces can also be provided for permitting the microprocessor 116 to control the operation of the controller 110 and the searching engine 114. Suitable software or firmware can be provided in memory for the conventional operations performed by the microprocessor 116. Further, program routines can be provided for the microprocessor 116 in accordance with the inventive concepts of the various embodiments of the present invention.

It should be understood that all or portions of the searching engine 114 and the microprocessor 116 can be a video processor 120 within contemplation of embodiments of the present invention. Further, all or portions of the controller 110, the searching engine 114, the microprocessor 116 and the transmission buffer 117 can be a bitstream source 122 within contemplation of various embodiments of the present invention. In one arrangement, the display device 118 can contain its own decoder (not pictured) for decoding all or a portion of any video signal read from the storage medium 112 and processed by the bitstream source 122. In this particular arrangement, the decoder (not shown) in the bitstream source 122 typically does not decode the video signal read from the storage medium 112. This particular embodiment can be referred to as a remote decoder arrangement. It should be noted, however, that the invention is not limited to this arrangement, as the invention can be practiced in other suitable systems.

In various embodiments of the present invention, semantic based trick mode playback in accordance with the present invention can control the replay of video content so that the video content is presented unevenly in relation to its presentation in normal time depending on the density of the selected semantic along the timeline of the video in the direction of the trick mode. For a fast forward or fast reverse trick mode, a user will have longer exposure to some semantic occurrences and will therefore be presented with more frames related to those occurrences during the time intervals having more semantic changes in the video content. This method provides the user with a more informative and, perhaps, user-friendly trick mode experience because the user can observe somewhat equal amounts of information from each semantic occurrence during trick mode play.

In the description that follows, an exemplary semantic is selected. That semantic is the scene or scene change in the video content. This semantic is used because it is so readily understood. It should be understood that the use of this exemplary semantic is not intended to limit the scope of the present invention in any way. It is contemplated that semantics could also be realized through manual metadata insertion during content creation or automatic metadata reference using other characteristics and data of the video content and ancillary files as one or more selected metadata elements for the video content, tags associated with the video content, subtitles in the video content, audio features in the video content including dialogue and characteristic noises, and any other definable identifiable aspects of the video content such as color features, scene details, instantaneous coding rate, motion vector variation, and the like.

In a fast trick mode, whether forward or reverse, the video content is replayed proportionally slower when there are relatively more scenes changes per unit time in the video content and the video content is replayed proportionally faster when there are relatively fewer scenes changes per unit time in the video content. Using proportionality based on the semantic time interval, this technique allows the viewer to experience each scene for a substantially similar duration in trick play regardless of how long or short the scene appears to be in normal play mode.

FIG. 1 depicts a flow diagram of a method for implementing at least a portion of semantics based trick mode play operation in accordance with an embodiment of the present invention. In FIG. 1 at step 1, the video content is assumed to have a total time duration of 3600 seconds (i.e., one hour) and a normal frame rate M of 30 frames per second (i.e., the frame rate during normal play). In one embodiment of the present invention, the time duration, T, and frame rate, M, can be included as metadata within the video content package itself. In alternate embodiments of the present invention, this information could also be supplied externally or determined through analysis of the content prior to invoking the trick mode operations.

In FIG. 1 at step 1, it is assumed that there N semantic instants or occurrences in the form of scene changes and N is 360 scenes. Each scene change is associated with a time of occurrence, $t_i$, for i from 0 to N, where $t_i=0$, at the beginning of the video content, and $t_N=T$, at the end of the video content. The semantic time interval, $T_i=t_{i+1}-t_i$, between consecutive scene changes has a random duration from one scene to the next. From a purely statistical standpoint, when the video content is played at a normal speed, the average duration for a scene interval will be T/N seconds or 10 seconds in the example. When the video content is played faster, for example, at an L times multiple of the normal playing speed, the average duration for a scene interval will be T/(L×N) seconds. If L is a frame rate multiplier of 2 times the normal frame rate M for the desired trick mode play, then the average scene duration in trick mode play is 5 seconds, when L=2.

The frame rate multiplier L is determined at steps 2 and 3 from a trick mode command received by the video display or presentation device such as a set top box combined with a television. A trick mode command is generally received from a remote control device as a fast forward or reverse command. The trick mode command includes the frame rate multiplier, L, and an indicia of a direction of replay (i.e., forward or reverse) in the trick mode. Since trick modes operate at frame rates that are less than or greater than the normal frame rate, M, it is assumed that the frame rate multiplier L is not equal to 1. In one example, the indicia of direction is formulated as a sign, wherein a positive value of L indicates the forward trick mode at L times the normal frame rate and a negative value of L indicates the reverse trick mode also at L times the normal frame rate.

As explained above, in various embodiments of the present invention, trick mode replay, whether forward or reverse, for each interval between key semantic instants or occurrences is carried out in $T/(L \times N)$ seconds, even though each semantic interval has a different duration. In view of the duration differences from one semantic interval to the next, this feature is achieved by replaying, in trick mode, the scene in a related semantic interval at a calculated trick mode frame rate of $Vi=[Ti/T] \times (N \times L \times M)$ frames per second, where $T_i = t_{i+1} - t_i$ and where the current position is at or between time instants $t_i$ and $t_{i+1}$ as shown in steps 4 and 5. In the example using the parameters above for a 2× trick mode, the calculated trick mode frame rate $V_i = 6T_i$, where $T_i = t_{i+1} - t_i$. This means that the trick mode frame rate is directly proportional to the semantic time interval between consecutive semantic occurrences or instants. Short semantic interval or higher density semantic occurrences are presented at a slower frame rate than longer semantic interval or lower density semantic occurrences.

Since semantic intervals (e.g., scene intervals) are different, it is possible that one or more semantic intervals could be sufficiently short that they possess an insufficient number of frames to display consecutively at the trick mode frame rate so that the semantic interval $T_i$ will not fill the entire $T/(L \times N)$ seconds of trick mode play at the frame rate $V_i$. In one embodiment of the present invention, this problem can be overcome by filling the frame sequence for that semantic interval with a sufficient number of dummy frames to effectively stretch the video content from that semantic interval over the entire replay period of $T/(L \times N)$ seconds.

Alternatively, it is also possible to avoid the above described problem entirely by determining whether each semantic interval $T_i$ that is replayed in a trick mode has a sufficient number of frames to span the full replay period of $T/(L \times N)$ seconds. This can be accomplished by comparing the magnitude of the calculated trick mode frame rate $V_i$ for a semantic period $T_i$ to a threshold rate. One satisfactory threshold frame rate is the normal frame rate, M. If the magnitude of $V_i$ is less than M, then the calculated trick mode frame rate is replaced by a new value and set to the normal frame rate M. The magnitude of the calculated frame rate is used to compensate for the fact that forward and reverse frame rates have positive and negatives signs, respectively. This resetting of the frame rate will insure that there are a sufficient number of frames for a semantic interval, so that when it is replayed at the new rate $V_i = M$, the frames fill the entire replay interval. Unfortunately, this means that the duration of this semantic interval, $T_i$, during trick play is not a full replay period of $T/(L \times N)$ seconds. Nonetheless, this will cause the semantic interval, $T_i$, to appear for a longer time duration than it would have at the originally calculated trick play frame rate. Thus, for this alternative embodiment, the trick mode frame rate for fast replay is not less than the normal speed M.

The alternative embodiment of the present invention discussed above can be best understood by using the parameter values provided for a 2× fast forward trick mode of replay. If the $i^{th}$ semantic interval has a duration of $T_i = 10$ seconds, then the calculated trick mode frame rate is $V_i = 60$ frames per second. On the other hand, if the $i^{th}$ semantic interval has a duration of $T_i = 4$ seconds, then the calculated trick mode frame rate is $V_i = 24$ frames per second, which is less than the normal frame rate M. In this latter case, the calculated trick mode frame rate of 24 frames per second is replaced or reset to the normal frame rate M of 30 frames per second.

If the trick mode replay speed is increased in this example to be 4× so that L=4, then a different result will be seen for the calculated trick mode frame rates. For the $i^{th}$ semantic interval having a duration of $T_i = 10$ seconds, the calculated trick mode frame rate is $V_i = 120$ frames per second, which greatly exceeds the normal frame rate. When the $i^{th}$ semantic interval has a duration of $T_i = 4$ seconds, the calculated trick mode frame rate is $V_i = 48$ frames per second, which is also greater than the normal frame rate M. In neither of these latter two cases is the calculated trick mode frame rate reset to, or replaced by, the normal frame rate M of 30 frames per second because both calculated rates exceed the normal frame rate.

Once the trick mode frame rate has been calculated and set or reset, the video content in the semantic interval, $T_i$, can be presented for display at the frame rate, $V_i$, in the trick mode defined by the received trick mode command.

In various embodiments of the present invention, during trick mode operation, even though some portions of the video content may be played at the normal speed in trick mode, it can be desirable to mute the audio associated with the displayed video content in the semantic interval to maintain consistency and a pleasant viewing experience.

When the video content associated with several consecutive semantic intervals is presented during trick mode play, it is possible that the speeds of trick mode play, $V_i$, could be significantly different. So much so, that the viewing experience is unsettling. It is contemplated in the present invention that there is a need for smoothly transitioning from one trick mode speed to another trick mode speed for consecutive semantic intervals when the difference between the two trick mode speeds is significant. The difference between the speeds could also be a magnitude of the difference. Moreover, the difference could instead be replaced by a ratio of the speeds. In one example from experimental practice, it is assumed that $T_i = T_{i-1}/10$. In order to avoid increasing the trick mode speed by a factor of 10 immediately after the semantic interval $T_{i-1}$, and in order to achieve a somewhat smoother transition to the higher speed, it is contemplated that the trick mode frame rate can be varied from the current trick mode frame rate for $T_i$ to the higher trick mode frame rate for $T_{i-1}$. In accordance with various embodiments of the present invention, the variation to achieve a smooth transition can occur in a linear fashion, a nonlinear fashion, or a stepwise fashion. In addition, in alternate embodiments of the present invention, logarithmic, exponential, and second order or higher curves are suitable for nonlinear variation. The stepwise approaches can involve linear and nonlinear variation to the step sizes. Obviously, step sizes in uniform increments are also possible. In addition, in alternate embodiments of the present invention, the variation from one trick mode frame rate to the next can occur over all the video content associated with the semantic interval or some initial portion of that video content. The variation can occur in equal increments of time, continuously over the time, or in unequal increments of time. In most cases, the use of equal step sizes and equal time increments will produce a more pleasing viewing experience with less hesitation in the displayed video content during the trick mode operation.

In the smoothing technique of the present invention, a difference between the trick mode frame rate as calculated and a current trick mode frame rate, $V_{i-1}$, related to a semantic occurrence in time interval $T_{i-1}$ is detected. When the magnitude of the rate difference exceeds a determined threshold, a trick mode frame rate for the $i^{th}$ semantic occurrence is varied, during display of the $i^{th}$ semantic occurrence, from said current trick mode frame rate $V_{i-1}$ to the trick mode frame rate $V_i$ as calculated during display of the $i^{th}$ semantic occurrence. In one embodiment of the present invention, a possible threshold can be related to more than a doubling or less than a halving of the frame rate from the current trick mode frame rate. In embodiments of the present invention, a simple ratio of the current and subsequent trick mode frame rates would simplify the comparison to such a threshold.

The scene based approach of the above described embodiment of the present invention can be extended to any semantic based trick mode. The semantics can be objects in video, subtitles, audio, meta-data, tags, and the like. It is contemplated that the semantic, upon which the trick mode operation is based, is received by the display system. The semantic can be selected from an on-screen menu or keypad entry on a remote control device or it can be transmitted to the display system in some other form such as via one or more data packets.

In various embodiments of the present invention, the number of semantic occurrences, N, in the video content is the actual number of occurrences for the selected semantic over the entire video content of duration T. However, it is not necessary that this actual number be used for N. Instead, in alternate embodiments of the present invention, a statistical value for N, such as an average number of semantic occurrences, can be used, where the average number is based on at least the video content duration and possibly other characteristics of the video content such as its genre like action, family, romantic, documentary, etc.

In instances in which scene or other semantic information is not available with, or even indexed to, the video content, several different approaches, in accordance with embodiments of the present invention, are available. More specifically, scene and other type of semantic extraction and indexing techniques are sufficiently well known in the art. These techniques will be apparent to persons skilled in this technical field. For example, two exemplary journal articles in this area are: B. Truong et al., "*Scene Extraction fin Motion Pictures*", IEEE Transactions on Circuits and Systems for Video Technology, Vol. 13, No. 1., pp. 5-15 (January 2003); and M. Cooper et al., "*Scene Boundary Detection via Video Self-Similarity Analysis*", Publication of FX Palo Alto Laboratory, No. FXPAL-PR-01-020 and also published in Proceeding of the 2001 International Conference on Image Processing, Vol. 3, pp. 378-381 (October 2001). Thus, in accordance with various embodiments of the present invention, through the use of one or more of these techniques, the video content can be analyzed to determine the number, N, of occurrences for the semantics in the video content. Furthermore, where necessary, the analysis can include operations to index each semantic occurrence to produce a value indicative of a time of the occurrence for each semantic occurrence. An example of such indexing can be found in International Publication No. WO 2006/092765 entitled "*Method of Video Indexing*", for Barbieri. When the analysis, as described above, produces the semantic occurrences for the video content together with the time values associated with the semantic occurrences, in embodiments of the present invention, each value indicative of the time of occurrence for each semantic occurrence is stored along with the semantic occurrence and/or its related index.

Embodiments of the present invention have been described generally in terms of a fast play trick mode. It is contemplated that the techniques herein could also be extended to other forms of trick mode play including, but not limited to, slow motion play.

Having described various embodiments for a method for implementing at least a portion of semantics based trick mode play operation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A method for controlling replay for video content in a trick mode of operation, the method comprising:
   receiving a trick mode command;
   determining a trick mode frame rate as a function of a time interval between consecutive semantics in the video content, a time duration of the video content, a number of occurrences for the semantics in the video content and a frame rate in a normal play mode of the video content; and
   wherein the video content related to the time interval in the trick mode defined by the received trick mode command is displayed at the trick mode frame rate,
   said trick mode frame rate, $V_i$, is determined as $V_i=[T_i/T]\times(N\times L\times M)$, where $T_i$ is a time interval between an $i^{th}$ and an $(i+1)^{th}$ consecutive semantics in the video content, T is a time duration of the video content, N is a number of occurrences for the semantics in the video content, and M is a frame rate in a normal play mode.

2. The method of claim 1, wherein said trick mode command identifies a frame rate multiplier and an indication of a direction of replay of said video content, wherein the frame rate is not equal to 1.

3. The method as defined in claim 1, wherein the consecutive semantics are selected from a group including at least one of scenes changes in the video content, selected metadata associated with the video content, selected tags associated with the video content, and selected audio associated with the video content, and selected statistic values of the video content.

4. The method as defined in claim 1, wherein the method further comprises:
   comparing the magnitude of said trick mode frame rate $V_i$ to said frame rate M; and
   said displaying further includes displaying the video content corresponding to the $i^{th}$ semantic occurrence at said frame rate M for the time interval $T_i$ when said comparing determines that the magnitude of said trick play mode frame rate $V_i$ is less than said frame rate M.

5. The method as defined in claim 1, wherein the method further comprises:
   detecting a difference between the trick mode frame rate as calculated and a current trick mode frame rate $V_{i-1}$ related to a semantic occurrence in time interval $T_{i-1}$; and
   when a magnitude of said difference exceeds a determined threshold, varying a trick mode frame rate for the $i^{th}$ semantic occurrence from said current trick mode frame rate $V_{i-1}$ to the trick mode frame rate $V_i$ as calculated during display of the $i^{th}$ semantic occurrence.

6. The method as defined in claim 5, wherein said changing is performed in a manner selected from the group consisting of stepwise, stepwise linear, stepwise nonlinear, and uniformly equal stepwise increments.

7. The method as defined in claim 1, wherein the number of occurrences for the semantics in the video content, is represented as a statistical average number of occurrences for said semantics over the video content, wherein the statistical average is based upon one or more associated characteristics of the video content.

8. The method as defined in claim 7, wherein said one or more associated characteristics of the video content are selected from a group consisting of at least the duration for the video content and a genre characteristic for the video content.

9. The method as defined in claim 1, further comprising analyzing the video content to determine the number of occurrences for the semantics in said video content.

10. The method as defined in claim 9, wherein said analyzing further comprises indexing each semantic occurrence to produce a value indicative of a time of said occurrence for each said semantic occurrence.

11. The method as defined in claim 10, wherein the method further comprises storing each semantic occurrence with said value indicative of the time of said occurrence for each said semantic occurrence.

12. The method as defined in claim 1, further comprising receiving the semantic identified in said video content.

13. The method as defined in claim 1, further comprising muting audio during trick mode replay of the video content corresponding to the semantic occurrence for said time interval.

* * * * *